United States Patent Office 3,030,372
Patented Apr. 17, 1962

3,030,372
1-(ω-AROYLALKYL)-4-ALKYL-1,2,3,6-TETRA-
HYDROPYRIDINES
Paul A. J. Janssen, Vosselaar, near Turnhout, Belgium,
assignor to Research Laboratorium Dr. C. Janssen
N.V., Beerse, Belgium, a company of Belgium
No Drawing. Filed Aug. 25, 1960, Ser. No. 51,793
12 Claims. (Cl. 260—297)

The present invention relates to compounds of the formula

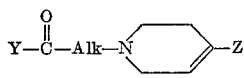

wherein Y is phenyl, fluorophenyl, methoxyphenyl and dimethoxyphenyl; Alk is alkylene, and Z is alkyl. Among the alkylene radicals represented by Alk, especially lower alkylene radicals are preferred, for example, methylene, ethylene, propylene, trimethylene, methylpropylene, tetramethylene, dimethylpropylene, hexamethylene, and the like. Among the alkyl radicals represented by Z, especially lower alkyl radicals are preferred, for example, methyl, ethyl, propyl, isopropyl, butyl, isobutyl, sec-butyl, tert-butyl, pentyl, isopentyl, tert-pentyl, neopentyl, hexyl, isohexyl, heptyl, octyl, and homologous monovalent hydrocarbon aggregates embracive of fewer than 9 carbon atoms arranged in chains, either straight or branched.

Equivalent to the foregoing compounds for purposes of the present invention are non-toxic acid addition salts thereof, the composition of which is depicted by the formula

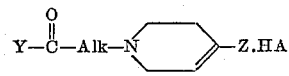

wherein Y, Alk and Z have the meanings hereinbefore assigned; A is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartarate, citrate, gluconate, ascorbate, benzoate, cinnamate, or the like—which in combination with the cationic portion of a salt aforesaid, is neither pharmacologically nor otherwise undesirable in physiological dosage.

The compounds to which this invention relates are useful because of their valuable pharmacological properties. Thus, for example, they possess analgesic, mydriatic, hypnotic, and barbiturate potentiating activity.

The subject compounds are prepared by condensation of an ω-haloalkyl aryl ketone with a 4-alkyl-1,2,3,6-tetrahydropyridine

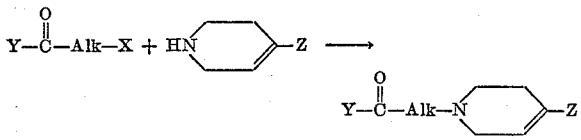

Those embodiments of the present invention which possess two carbon atoms joining the carbonyl and nitrogen functions are also prepared by a Mannich reaction involving an aryl methyl ketone, a 4-alkyl-1,2,3,6-tetrahydropyridine and formaldehyde

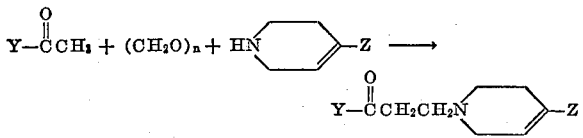

Conversion of the amine bases of this invention to corresponding acid addition salts is accomplished by simple admixture of these compounds with one equivalent of any of various inorganic and strong organic acids, the anionic portion of which conforms to A as hereinabove defined.

The following examples describe in detail certain of the compounds illustrative of the present invention, and methods which have been devised for their manufacture. However, the invention is not to be construed as limited thereby, either in spirit or in scope, since it will be apparent to those skilled in the art of organic synthesis that many modifications, both of materials and methods, may be practiced without departing from the purpose and intent of this disclosure. In the examples hereinafter detailed, temperatures are given in degrees centigrade, pressures in pound per square inch, and relative amounts of materials are given in parts by weight, except as otherwise noted.

Example 1

*1-(2-benzoylethyl)-4-ethyl-1,2,3,6-tetrahydropyridine hydrochloride.*—A mixture of 48 parts of acetophenone, 18 parts of paraformaldehyde, 47 parts of 4-ethyl-1,2,3,6-tetrahydropyridine, 400 parts of isopropyl alcohol and 400 parts of concentrated hydrochloric acid is heated under reflux for 1 hour. At the end of this time an additional 12 parts of paraformaldehyde is added, and the resultant mixture is heated under reflux for 1 hour, and then allowed to stand at room temperatures overnight. The mixture thus obtained is evaporated to dryness, and the residue is taken up in 360 parts of acetone; the acetone solution is filtered, and the filtrate is chilled. The precipitate thus obtained is removed by filtration, washed with acetone, and dried in air to yield crude, crystalline 1-(2-benzoylethyl)-4-ethyl-1,2,3,6-tetrahydropyridine hydrochloride. Recrystallization of the crude product from 640 parts of isopropyl alcohol affords the pure product as white crystalline platelets, melting at about 174–175°. The structure may be expressed as

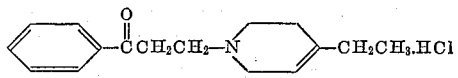

Example 2

*1-[2-(4-fluorobenzoyl)ethyl] - 4 - ethyl-1,2,3,6-tetrahydropyridine hydrochloride.*—Substitution of 55 parts of p-fluoroacetophenone for the acetophenone of Example 1 gives, by the procedure therein detailed, 1-[2-(4-fluorobenzoyl)ethyl]-4-ethyl-1,2,3,6 - tetrahydropyridine hydrochloride, melting at about 165–166°. The structure may be expressed as

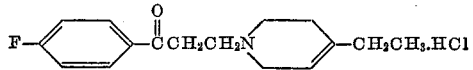

Example 3

*1-[2-(2-fluorobenzoyl)ethyl] - 4 - ethyl-1,2,3,6-tetrahydropyridine hydrochloride.*—Substitution of 55 parts of o-fluoroacetophenone for the acetophenone of Example 1 gives, by the procedure therein detailed, 1-[2-(2-fluorobenzoyl)ethyl] - 4 - ethyl-1,2,3,6-tetrahydropyridine. The structure may be expressed as

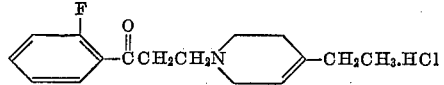

Example 4

*1-[2-(4-methoxybenzoyl)ethyl] - 4 - ethyl-1,2,3,6-tetrahydropyridine hydrochloride.*—Substitution of 60 parts of p-methoxyacetophenone for the acetophenone of Example 1 gives, by the procedure therein detailed, 1-[2-(4-methoxybenzoyl)ethyl] - 4 - ethyl-1,2,3,6-tetrahydropyridine hydrochloride, melting at 162–164°. The structure may be expressed as

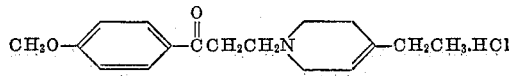

Example 5

*1-[2-(2-methoxybenzoyl)ethyl] - 4 - ethyl-1,2,3,6-tetrahydropyridine hydrochloride.*—Substitution of 60 parts of o-methoxyacetophenone for the acetophenone of Example 1 gives, by the procedure therein detailed, 1-[2-(2-methoxybenzoyl)ethyl] - 4 - ethyl-1,2,3,6-tetrahydropyridine hydrochloride. The structure may be expressed as

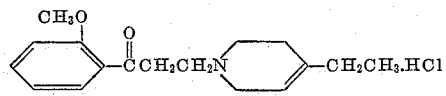

Example 6

*1-(3-benzoylpropyl) - 4 - ethyl-1,2,3,6-tetrahydropyridine hydrochloride.*—A mixture of 91 parts of γ-chlorobutyrophenone, 112 parts of 4-ethyl-1,2,3,6-tetrahydropyridine and 1200 parts of anhydrous toluene is heated in a sealed tube at 110° for 48 hours. At the end of this time the reaction mixture is cooled to room temperatures, and the resultant precipitate is removed by filtration. The filtrate is extracted with water, the aqueous solution thus obtained is extracted with ether, and the resultant ether layer is combined with the original toluene solution. The organic solution is dried over anhydrous potassium carbonate, and then filtered. Hydrogen chloride gas is passed through the filtrate, the resultant precipitate is removed by filtration, and the filtrate thus obtained is evaporated to dryness to yield a residue which is combined with the previously removed precipitate. The combined solid material is taken up in 800 parts of acetone and 1000 parts of isopropyl alcohol, and the solution thus obtained is filtered. The filtrate is allowed to stand at room temperatures for 3 hours, whereupon precipitation occurs; the precipitate is removed by filtration, washed with acetone, and dried in air to yield 1-(3-benzoylpropyl) - 4 - ethyl-1,2,3,6-tetrahydropyridine hydrochloride, melting at about 199–200°. The filtrate is cooled to obtain a second crop, melting at 188–190°. The structure may be expressed as

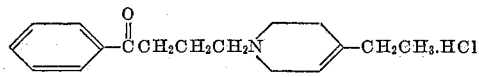

Example 7

*1-(4-benzoylbutyl) - 4 - ethyl-1,2,3,6-tetrahydropyridine hydrochloride.*—Substitution of 97 parts of Δ-chlorovalerophenone for the γ-chlorobutyrophenone of Example 6, and adoption of reactions conditions of 120° for 40 hours in place of the values for these variables in the cited example yields, by the procedure therein detailed, 1-(4-benzoylbutyl) - 4 - ethyl-1,2,3,6-tetrahydropyridine hydrochloride, melting at about 157–158°. The structure may be expressed as

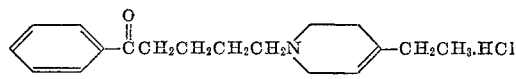

Example 8

*1-[3-(4-fluorobenzoyl)propyl] - 4 - ethyl-1,2,3,6-tetrahydropyridine hydrochloride.*—Substitution of 100 parts of γ-chloro-p-fluorobutyrophenone for the γ-chlorobutyrophenone of Example 6, and adoption of reaction conditions of 120° for 40 hours in place of the values for these variables in the cited example yields, by the procedure therein detailed, 1-[3-(4-fluorobenzoyl)propyl - 4 - ethyl-1,2,3,6-tetrahydropyridine hydrochloride, melting at 188–190°. The structure may be expressed as

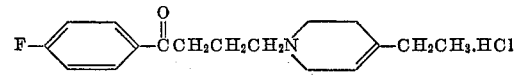

Example 9

*1-[3-(2-fluorobenzoyl)propyl] - 4 - ethyl-1,2,3,6-tetrahydropyridine hydrochloride.*—Substitution of 100 parts of γ-chloro-o-fluorobutyrophenone for the γ-chlorobutyrophenone of Example 6, gives, by the procedure therein detailed, 1-[3-(2-fluorobenzoyl)propyl] - 4 - ethyl-1,2,3,6-tetrahydropyridine hydrochloride. The structure may be expressed as

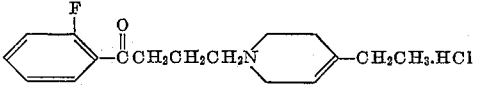

Example 10

*1-[3-(4-methoxybenzoyl)propyl] - 4 - ethyl - 1,2,3,6-tetrahydropyridine hydrochloride.*—Substitution of 105 parts of γ-chloro-p-methoxybutyrophenone for the γ-chlorobutyrophenone of Example 6, and adoption of reaction conditions of 130° for 40 hours in place of the values of these variables in the cited example gives, by the procedure therein detailed, 1-[3-(4-methoxybenzoyl)-propyl]-4-ethyl-1,2,3,6 - tetrahydropyridine hydrochloride melting at 154–157°. The structure may be expressed as

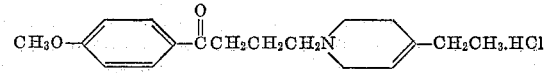

Example 11

*1-[3-(2-methoxybenzoyl)propyl]-4-ethyl - 1,2,3,6-tetrahydropyridine hydrochloride.*—Substitution of 105 parts of γ-chloro-o-methoxybutyrophenone for the γ-chlorobutyrophenone of Example 6 gives, by the procedure therein detailed, 1 - [3 - (2 - methoxybenzoyl)propyl] - 4-ethyl - 1,2,3,6 - tetrahydropyridine hydrochloride. The structure may be expressed as

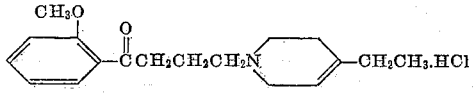

Example 12

*1-(2-benzoylethyl)-4-propyl - 1,2,3,6 - tetrahydropyridine hydrochloride.*—A mixture of 43 parts of β-chloropropiophenone, 63 parts of 4-propyl-1,2,3,6-tetrahydropyridine and 1000 parts of anhydrous toluene is heated in a sealed tube at 100° for 2 hours; a precipitate is formed after about 15 minutes. The reaction mixture thus obtained is cooled to room temperatures, water and ether are added, and the resultant layered mixture is shaken; the organic layer is dried over anhydrous potassium carbonate. Hydrogen chloride gas is passed through the dried organic layer, and the resultant precipitate is removed by filtration, and taken up in 800 parts of hot acetone. The acetone solution is filtered, and then allowed to stand for 2 hours at room temperatures. The resultant precipitate is removed by filtration; the crude 1-(2-benzoylethyl)-4-propyl - 1,2,3,6 - tetrahydropyridine hydrochloride thus obtained melts at about 161–162°. The filtrate is cooled to obtain a second crop melting at 157–160°. The structure may be expressed as

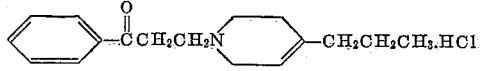

Example 13

*1-(3-benzoylpropyl)-4-propyl - 1,2,3,6 - tetrahydropyridine hydrochloride.*—Substitution of 47 parts of γ-chlorobutyrophenone for the β-chloropropiophenone of Example 12, and adoption of reaction conditions of 145° for 40 hours in place of the values for these variables in the cited example gives, by the procedure therein detailed, 1-(3-benzoylpropyl)-4-propyl - 1,2,3,6 - tetrahydropyridine hydrochloride, melting at 176–178°. The structure may be expressed as

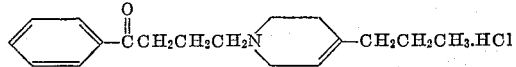

Example 14

1-(4-benzoylbutyl)-4-propyl - 1,2,3,6 - tetrahydropyridine hydrochloride.—Substitution of 49 parts of Δ-chlorovalerophenone for the β-chloropropiophenone of Example 12, and adoption of reaction conditions of 140° for 40 hours in place of the values for these variables in the cited example gives, by the procedure therein detailed, 1-(4-benzoylbutyl)-4-propyl - 1,2,3,6 - tetrahydropyridine hydrochloride, melting at about 153–154°. The structure may be expressed as

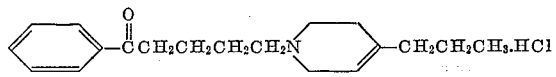

Example 15

1-[2-(4-fluorobenzoyl)ethyl]-4-propyl - 1,2,3,6 - tetrahydropyridine hydrochloride.—Substitution of 48 parts of β-chloro-p-fluoropropiophenone for the β-chloropropiophenone of Example 12 gives, by the procedure therein detailed, 1-[2-(4-fluorobenzoyl)ethyl] - 4 - propyl-1,2,3,6-tetrahydropyridine hydrochloride, melting at about 178–179°. The structure may be expressed as

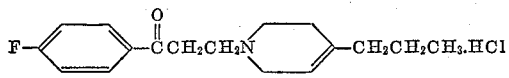

Example 16

1-[2-(2-fluorobenzoyl)ethyl]-4-propyl - 1,2,3,6 - tetrahydropyridine hydrochloride.—Substitution of 48 parts of β-chloro-o-fluoropropiophenone for the β-chloropropiophenone of Example 12 gives, by the procedure therein detailed, 1-[2-(2-fluorobenzoyl)ethyl] - 4 - propyl-1,2,3,6-tetrahydropyridine hydrochloride. The structure may be expressed as

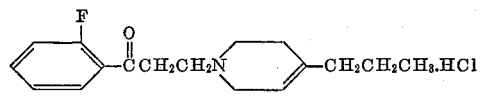

Example 17

1-[3-(4-fluorobenzoyl)propyl]-4-propyl - 1,2,3,6 - tetrahydropyridine hydrochloride.—Substitution of 50 parts of γ-chloro-p-fluorobutyrophenone for the β-chloropropiophenone of Example 12, and adoption of reaction conditions of 125° for 45 hours in place of the values for these variables in the cited example gives, by the procedure therein detailed, 1-[3-(4-fluorobenzoyl)propyl]-4-propyl-1,2,3,6-tetrahydropyridine hydrochloride, melting at about 184–185°. The structure may be expressed as

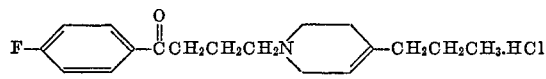

Example 18

1-[3-(2-fluorobenzoyl)propyl]-4-propyl-1,2,3,6 - tetrahydropyridine hydrochloride.—Substitution of 50 parts of γ-chloro-o-fluorobutyrophenone for the β-chloro-propiophenone of Example 12 gives, by the procedure therein detailed 1 - [3 - (2-fluorobenzoyl)propyl]-4-propyl-1,2,3,6-tetrahydropyridine hydrochloride. The structure may be expressed as

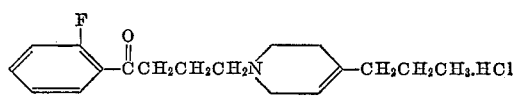

Example 19

1-[2-(4-methoxybenzoyl)ethyl]-4-propyl-1,2,3,6 - tetrahydropyridine hydrochloride.—Substitution of 50 parts of β-chloro-p-methoxypropiophenone for the β-chloropropiophenone in Example 12 gives, by the procedure therein detailed, 1-[2-(4-methoxybenzoyl)ethyl]-4-propyl-1,2,3,6-tetrahydropyridine hydrochloride, melting at 163–165°. The structure may be expressed as

Example 20

1-[2-(2-methoxybenzoyl)ethyl]-4-propyl-1,2,3,6 - tetrahydropyridine hydrochloride.—Substitution of 50 parts of β-chloro-o-methoxypropiophenone for the β-chloropropiophenone of Example 12 gives, by the procedure therein detailed, 1 - [2-(2-methoxybenzoyl)ethyl]-4-propyl-1,2,3,6-tetrahydropyridine hydrochloride. The structure may be expressed as

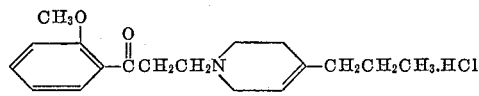

Example 21

1 - [3 - (4-methoxybenzoyl)propyl]-4-propyl - 1,2,3,6-tetrahydropyridine hydrochloride.—Substitution of 53 parts of γ-chloro-p-methoxybutyrophenone for the β-chloropropiophenone of Example 12, and adoption of reaction conditions of 124° for 40 hours in place of the values of these variables in the cited example gives, by the procedure therein detailed, 1-[3-(4-methoxybenzoyl)propyl]-4-propyl-1,2,3,6 - tetrahydropyridine hydrochloride, melting at about 165–166°. The structure may be expressed as

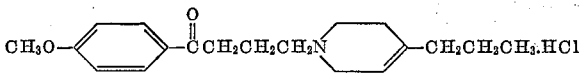

Example 22

1 - [3 - (2 - methoxybenzoyl)propyl]-4-propyl-1,2,3,6-tetrahydropyridine hydrochloride.—Substitution of 53 parts of γ-chloro-o-methoxybutyrophenone for the β-chloropropiophenone of Example 12 gives, by the procedure therein detailed, 1-[3-(2 - methoxybenzoyl)propyl]-4-propyl-1,2,3,6 - tetrahydropyridine hydrochloride. The structure may be expressed as

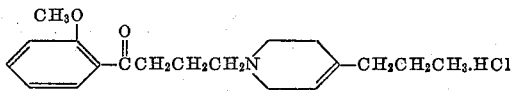

Example 23

1-[3(3,4-dimethoxybenzoyl)propyl]-4-propyl - 1,2,3,6-tetrahydropyridine hydrochloride.—Substitution of 61 parts of γ-chloro-3,4-dimethoxybutyrophenone for the β-chloropropiophenone of Example 12, and adoption of reaction conditions of 140° for 65 hours in place of the values of these variables in the cited example gives, by the procedure therein detailed, 1-[3-(3,4-dimethoxybenzoyl)propyl]-4-propyl-1,2,3,6-tetrahydropyridine hydrochloride, melting at about 144–145°. The structure may be expressed as

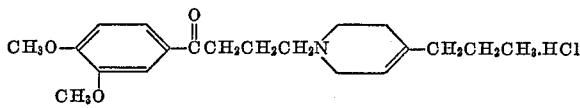

Example 24

1-[3-(2,4 - dimethoxybenzoyl)propyl]-4-ethyl - 1,2,3,6-tetrahydropyridine oxalate.—A mixture of 61 parts of γ-chloro-2,4-dimethoxybutyrophenone, 56 parts of 4-ethyl-1,2,3,6-tetrahydropyridine and 1200 parts of anhydrous toluene is heated in a sealed tube at 120° for 40 hours. The reaction mixture is cooled to room temperatures, and extracted with water; the aqueous phase is back-extracted with ether, and the ethereal layer is added to the toluene solution. The organic solution thus obtained is dried over anhydrous potassium carbonate, and filtered; the filtrate is evaporated to dryness, and the residue is taken up in 800 parts of ethanol. To the resultant solution is added 32 parts of oxalic acid dihydrate, the solvents are removed by evaporation, and the oily residue which remains is taken up in 1200 parts of acetone. The resultant acetone solution is cooled to 0° for 48 hours, and the precipitate which results is removed by filtration to give 1-[3-(2,4-dimethoxybenzoyl)propyl]-4-ethyl-1,2,3,6-tetrahydropyridine oxalate. The crude salt is dissolved with heating in 1200 parts of acetone and 400 parts of isopropyl alcohol; the solution thus obtained is allowed to cool to room temperature, whereupon precipitation occurs. The pure salt is removed by filtration, and melts at 138–140°. The structure may be expressed as

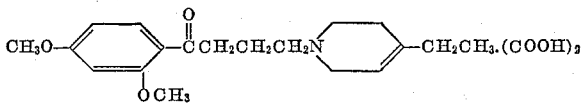

Example 25

*1-[3-(3,4-dimethoxybenzoyl)propyl]-4-ethyl - 1,2,3,6-tetrahydropyridine oxalate.*—Substitution of 61 parts of γ-chloro-3,4-dimethoxybutyrophenone for the γ-chloro-2,4-dimethoxybutyrophenone of Example 24 gives, by the procedure therein detailed, 1-[3-(3,4-dimethoxybenzoyl)propyl]-4-ethyl-1,2,3,6 - tetrahydropyridine oxalate, melting at 136–140°. The structure may be expressed as

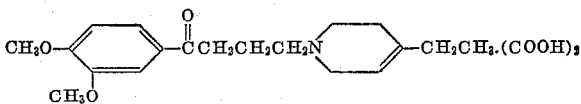

Example 26

*1-[3-(2,4-dimethoxybenzoyl)propyl]-4-propyl - 1,2,3,6-tetrahydropyridine oxalate.*—Substitution of 63 parts of 4-propyl-1,2,3,6-tetrahydropyridine for the 4-ethyl-1,2,3,6-tetrahydropyridine of Example 24, and adoption of reaction conditions of 140° for 65 hours in place of the values of these variables in the cited example gives, by the procedure therein detailed, 1-[3-(2,4-dimethoxybenzoyl)propyl]-4-propyl-1,2,3,6-tetrahydropyridine oxalate, melting at about 144–145°. The structure may be expressed as

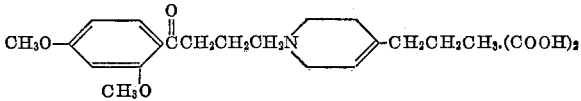

What is claimed is:
1. A compound of the formula

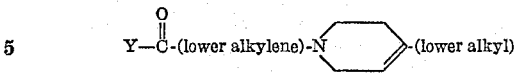

wherein Y is a member of the class consisting of phenyl, mono-fluorophenyl, mono-methoxyphenyl and di-methoxyphenyl.

2. A compound of the formula

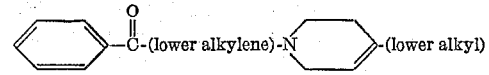

3. 1 - (3 - benzoylpropyl)-4-ethyl-1,2,3,6 - tetrahydropyridine.
4. 1 - (3 - benzoylpropyl)-4-propyl-1,2,3,6-tetrahydropyridine.
5. A compound of the formula

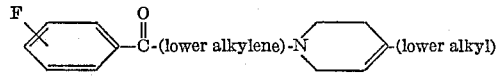

6. 1 - [3 - (4 - fluorobenzoyl)propyl]-4-ethyl-1,2,3,6-tetrahydropyridine.
7. 1 - [3 - (4-fluorobenzoyl)propyl]-4-propyl-1,2,3,6-tetrahydropyridine.
8. 1 - [2 - (4 - fluorobenzoyl)ethyl]-4-propyl-1,2,3,6-tetrahydropyridine.
9. A compound of the formula

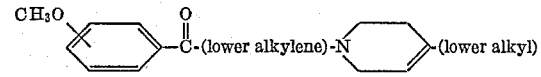

10. 1 - [3-(4-methoxybenzoyl)propyl]-4-ethyl-1,2,3,6-tetrahydropyridine.
11. A compound of the formula

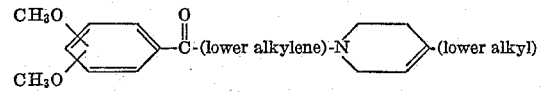

12. 1 - [3 - (3,4-dimethoxybenzoyl)propyl]-4-propyl-1,2,3,6-tetrahydropyridine.

References Cited in the file of this patent
UNITED STATES PATENTS
2,973,365    Janssen _____ Feb. 28, 1961

OTHER REFERENCES
Lutz et al.: Chem. Absts., vol. 42, column 1224 (1948).